(12) United States Patent
Byagowi

(10) Patent No.: US 11,113,058 B1
(45) Date of Patent: Sep. 7, 2021

(54) RECONFIGURABLE PROCESSING UNIT

(71) Applicant: Facebook, Inc., Menlo Park, CA (US)

(72) Inventor: Ahmad Byagowi, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 99 days.

(21) Appl. No.: 16/196,858

(22) Filed: Nov. 20, 2018

(51) Int. Cl.
*G06F 9/30* (2018.01)
*G06F 9/32* (2018.01)

(52) U.S. Cl.
CPC ...... *G06F 9/30047* (2013.01); *G06F 9/30134* (2013.01); *G06F 9/30145* (2013.01); *G06F 9/321* (2013.01)

(58) Field of Classification Search
CPC ............. G06F 9/30047; G06F 9/30134; G06F 15/7867; G06F 9/45504; G06F 9/45516; G06F 8/447; G06F 9/3017
See application file for complete search history.

(56) References Cited

U.S. PATENT DOCUMENTS

| | | | | |
|---|---|---|---|---|
| 5,619,665 A | * | 4/1997 | Emma ................. | G06F 9/30174 703/26 |
| 5,655,122 A | * | 8/1997 | Wu ........................ | G06F 8/445 712/239 |
| 5,748,979 A | * | 5/1998 | Trimberger ............ | G06F 8/447 712/200 |
| 5,751,982 A | * | 5/1998 | Morley ............... | G06F 9/45504 703/26 |
| 5,769,793 A | * | 6/1998 | Pincus ................ | A61B 5/0452 600/515 |
| 5,790,625 A | * | 8/1998 | Arimilli ................. | H03K 23/54 377/16 |
| 5,794,068 A | * | 8/1998 | Asghar ................. | G06F 9/3017 712/203 |

\* cited by examiner

*Primary Examiner* — William B Partridge
*Assistant Examiner* — Kasim Alli
(74) *Attorney, Agent, or Firm* — Van Pelt, Yi & James LLP

(57) ABSTRACT

Instructions to be executed by a processing unit that is configured to handle a predefined instruction set are prefetched. A set of instructions in the prefetched instructions to be combined as a macro instruction to be executed by a reconfigurable logic unit is identified. The macro instruction is issued to the reconfigurable logic unit rather than issuing the identified set of instructions to the processing unit.

20 Claims, 8 Drawing Sheets

RECONFIGURABLE PROCESSING UNIT

BACKGROUND OF THE INVENTION

A central processing unit (CPU) is electronic circuitry, within a computer, that executes computer program instructions. A key component of CPUs is a processing unit whose functions include performing arithmetic and logic operations. The processing unit operates on data stored in registers and executes instructions belonging to a predefined instruction set. Examples of instructions belonging to predefined instructions sets include instructions associated with copying data from memory to a register and vice versa, performing an arithmetic operation (such as addition) with respect to values stored in two registers, comparing values stored in two registers, and controlling computer program flow (e.g., by branching or otherwise deviating from executing a sequence of instructions in order).

BRIEF DESCRIPTION OF THE DRAWINGS

Various embodiments of the invention are disclosed in the following detailed description and the accompanying drawings.

DETAILED DESCRIPTION

Figure 1:
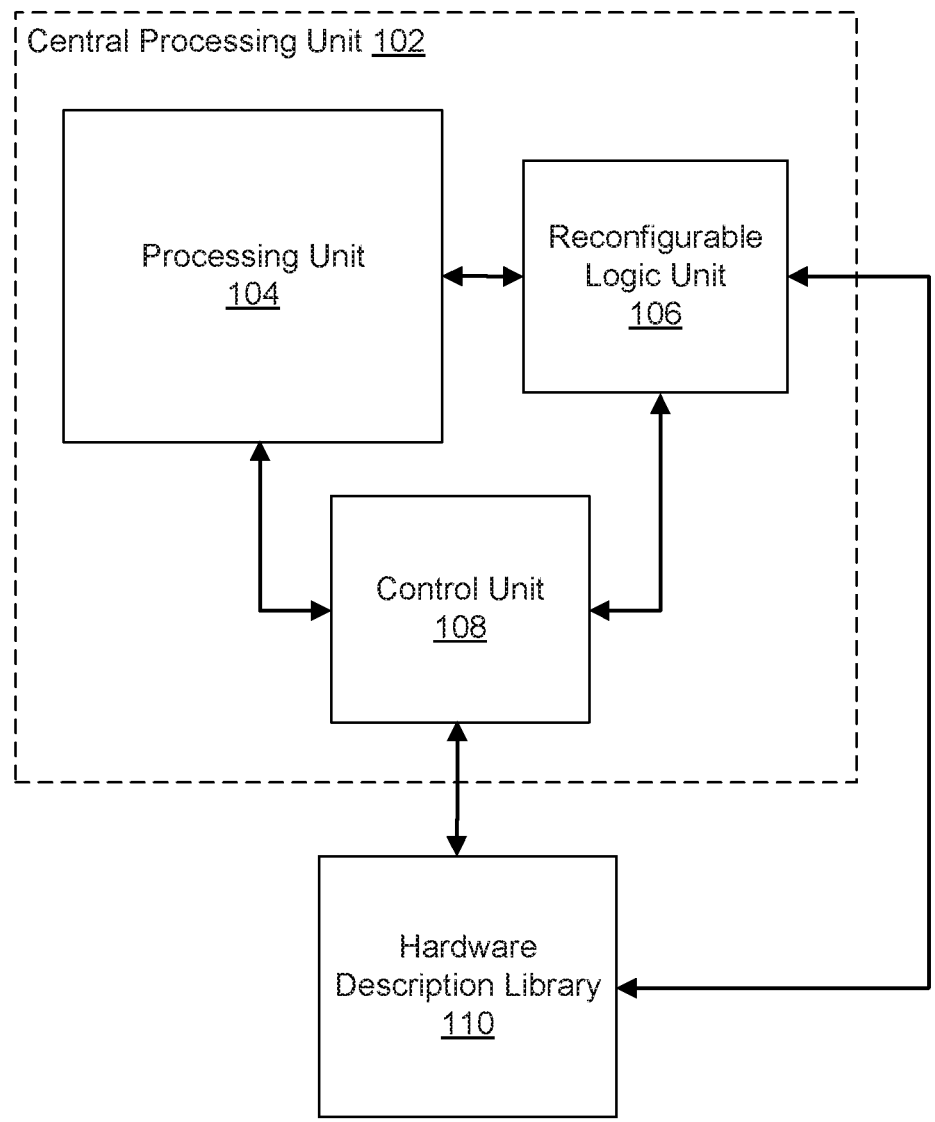
FIG. 1 is a block diagram illustrating an embodiment of a reconfigurable processing unit system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Traditional CPUs suffer from a number of drawbacks. For example, processing units configured to handle a predefined instruction set cannot be reconfigured to handle specialized instructions that are not within the predefined instruction set. As a result, efficiency gains from using such specialized instructions (e.g., specialized instructions that are tailored to specific applications) are not realized. Consequently, research into CPUs is ongoing, and there is a need to improve CPUs to obtain flexibility with respect to instructions that CPUs are able to handle.

A reconfigurable processing unit is disclosed. In various embodiments, the reconfigurable processing unit is a CPU comprising a processing unit configured to handle a predefined instruction set, a reconfigurable logic unit, and a control unit. Examples of predefined instruction sets for the processing unit include (but are not limited to) reduced instruction set computer (RISC) instruction sets such as MIPS (Microprocessor without Interlocked Pipeline Stages), SPARC (Scalable Processor Architecture), and ARM (Advanced RISC Machine) instruction sets. In some embodiments, the reconfigurable logic unit is a field-programmable gate array (FPGA). In various embodiments, logic implementations to handle specialized instructions that are not a part of the predefined instruction set are pre-programmed into the reconfigurable logic unit. These specialized instructions, of which a specialized instruction set (that a reconfigurable logic unit is configured to handle) are comprised, are hereinafter referred to as macro instructions. In various embodiments, macro instructions are issued in lieu of sets of instructions belonging to the predefined instruction set. Instructions belonging to the predefined instruction set are referred to herein as non-macro instructions. Computing performance gains may be achieved by replacing sets of non-macro instructions with macro instructions, particularly when a macro instruction (replacing a plurality of non-macro instructions) can be executed in the same or approximately the same time it takes to execute a single non-macro instruction. In various embodiments, the control unit comprises digital circuitry that handles the coordination of issuance of macro instructions and non-macro instructions. The control unit is configured to prefetch non-macro instructions to be executed by the processing unit, identify a set of non-macro instructions in the prefetched instructions to be combined as a macro instruction to be executed by the reconfigurable logic unit, and, where appropriate, issue the macro instruction to the reconfigurable logic unit rather than issuing the set of non-macro instructions to the processing unit.

Macro instructions replace sets of non-macro instructions. In various embodiments, a macro instruction replaces a specific sequence of non-macro instructions in which the specific sequence of non-macro instructions occurs frequently enough that replacing it with a macro instruction to be executed by a reconfigurable logic unit could result in performance gains, especially if the macro instruction can be executed using significantly fewer clock cycles (e.g., one clock cycle) than the specific sequence of non-macro instructions. For example, if a set of non-macro instructions that copies the value stored in a specified register into ten other registers one after another (using ten non-macro instructions) is replaced by a macro instruction that copies the value stored in the specified register into the ten other registers all at once in the time it takes to execute one or a few non-macro instructions, then a performance gain would be achieved. Sequences of non-macro instructions to be replaced by macro instructions may vary in length. In various embodiments, statistical analysis is performed on groupings of non-macro instructions to determine frequent patterns (which could be sequences of various lengths) of non-macro instructions. In some embodiments, frequent patterns are tracked using counters, and when a counter associated with a specific sequence of non-macro instructions reaches a specified threshold, a logic implementation to handle a macro instruction that can replace the sequence of non-macro instructions is programmed into a reconfigurable logic unit. In some embodiments, logic implementations to handle macro instructions are programmed into a reconfigurable logic unit from a hardware description library that stores logic implementations to handle macro instructions. Frequent patterns of non-macro instructions may be analyzed and/or visualized using charts that map recurrences of non-macro instruction patterns onto N-dimensional spaces, where N is the number of instructions in the non-macro instruction patterns that are mapped. These charts are referred to herein as Poincaré maps.

FIG. 1 is a block diagram illustrating an embodiment of a reconfigurable processing unit system. In the example shown, the system includes central processing unit 102 and hardware description library 110. Central processing unit 102 includes processing unit 104, reconfigurable logic unit 106, and control unit 108. The illustration of central processing unit 102 has ben simplified to illustrate the example clearly.

Processing unit 104 is configured to handle a predefined instruction set. Examples of predefined instruction sets for the processing unit include (but are not limited to) reduced instruction set computer (RISC) instruction sets such as MIPS (Microprocessor without Interlocked Pipeline Stages), SPARC (Scalable Processor Architecture), and ARM (Advanced RISC Machine) instruction sets. Processor unit 104 may be implemented via various microprocessor architectures to support whichever predefined instruction set it is configured to handle. Processor unit 104 includes an arithmetic logic unit and data registers. Examples of data registers include a program counter, a current instruction register, a memory address register, a memory data register, and other registers. Processing unit 104 operates on data stored in registers and executes non-macro instructions. Examples of non-macro instructions include individual instructions associated with copying data from memory to a register and vice versa, performing an arithmetic operation (such as addition) with respect to values stored in two registers, comparing values stored in two registers, and controlling computer program flow (e.g., by branching or otherwise deviating from executing a sequence of instructions in order). The components shown in FIG. 1 communicate with one another via a bus (not shown). Examples of buses include internal data buses, memory buses, system buses, front-side buses, and a unified processor interface (UPI). As shown in FIG. 1, processor unit 104 communicates with reconfigurable logic unit 106 and control unit 108.

Reconfigurable logic unit 106 is programmed with logic implementations to handle macro instructions. Reconfigurable logic unit 106 has access to processing unit 104 (e.g., data registers of processing unit 104). When appropriate, reconfigurable logic unit 106 executes macro instructions in lieu of processing unit 104 executing corresponding sets of non-macro instructions. In various embodiments, reconfigurable logic unit 106 is a field-programmable gate array (FPGA). In some embodiments, reconfigurable logic unit 106 is implemented on the same integrated circuit as processing unit 104. For example, an FPGA can be built on the same integrated circuit as an ARM-based processing unit. Potential advantages of implementing reconfigurable logic unit 106 and processing unit 104 on the same integrated circuit include faster communication between reconfigurable logic unit 106 and processing unit 104 and more efficient sharing of access to data registers. Other programmable components, such as complex programmable logic devices (CPLDs) may also be used. In some embodiments, reconfigurable logic unit 106 is an application specific integrated circuit (ASIC). An ASIC is not reconfigurable in the same sense that an FPGA is reconfigurable, but an ASIC could be used in situations where it stores macro instruction sets that do not need to be modified and/or updated, which might be the case after using an FPGA implementation for a significant period of time for a specific computing application and determining that no additional macro instructions are needed for that specific computing application. Potential advantages of using an ASIC instead of a re-programmable component include faster computations and lower power consumption. In some embodiments, reconfigurable logic unit 106 includes both a re-programmable component (e.g., an FPGA) as well as an ASIC. An advantage of this configuration is potentially better performance for macro instruction sets that do not need to be modified and/or updated (and thus implemented on the ASIC) combined with flexibility to support new macro instructions using the re-programmable component (e.g., an FPGA).

Control unit 108 coordinates the execution of non-macro instructions by processing unit 104 and macro instructions by reconfigurable logic unit 106. In various embodiments, control unit 108 is implemented as a collection of logic gates. For example, control unit 108 may be implemented as a programmable array logic (PAL) device, a CPLD, an FPGA, an ASIC, or any other type of digital circuitry. In some embodiments, control unit 108 is implemented on the same integrated circuit as processing unit 104. For example, control unit 108 may be implemented within processing unit 104. Control unit 108 is configured to prefetch non-macro instructions to be executed by a processing unit (e.g., processing unit 104), identify a set of non-macro instructions in the prefetched instructions to be combined as a macro instruction to be executed by a reconfigurable logic unit (e.g., reconfigurable logic unit 106), and, where appropriate, issue the macro instruction to the reconfigurable logic unit rather than issuing the set of non-macro instructions to the processing unit. In various embodiments, control unit 108 replaces sets of non-macro instructions with macro instructions that reconfigurable logic unit 106 is configured to handle. In various embodiments, control unit 108 analyzes non-macro instructions that it has prefetched in order to determine frequencies of various non-macro instruction patterns. Control unit 108 may determine frequencies of various non-macro instruction patterns by using counters to count occurrences of the various non-macro instruction patterns. In some embodiments, control unit 108 uses counters that are implemented as shift registers. In some embodiments, control unit 108 sends prefetched instructions to storage (not shown), after which a software program analyzes the prefetched instructions to determine frequencies of various non-macro instruction patterns. The analysis performed by the software program may be done offline and may be more comprehensive that what is feasible using digital circuitry. This software analysis might be appropriate in situations in which analysis of non-macro instruction patterns to generate macro instructions to program into reconfigurable logic unit 106 is only performed occasionally.

Hardware description library 110 stores logic implementations to handle macro instructions that are to be programmed into reconfigurable logic unit 106. In various embodiments, hardware description library 110 determines which macro instructions are to be handled by reconfigurable logic unit 106 based on analysis (e.g., of frequencies of various non-macro instruction patterns as visualized in Poincare maps) performed by control unit 108 (whether the analysis is performed in hardware or software). Hardware description library 110 may be implemented in software, as well as via digital circuitry. In various embodiments, hardware description library 110 exists in a memory that can be shared across multiple CPUs. For example, an instance of hardware description library 110 can be shared by multiple computers in a data center and/or across multiple data centers connected via a network, which would be particularly efficient if the multiple computers run similar programs that benefit from the use of similar macro instructions. Examples of a network that can be used to connect multiple computers include one or more of the following: a direct or indirect physical communication connection, mobile communication network, Internet, intranet, Local Area Network, Wide Area Network, Storage Area Network, and any other form of connecting two or more systems, components, or storage and/or computing devices together. In various embodiments, hardware description library 110 is updated periodically for new macro instructions to reflect new patterns of non-macro instruction use. In some embodiments, permutations of various non-macro instruction sequences of various lengths are pre-synthesized into corresponding macro instruction implementations that are stored in hardware description library 110 and able to be transferred to reconfigurable logic unit 106. For example, all permutations of sequences of non-macro instructions that are ten instructions in length can be accounted for in hardware description library 110, and if control unit 108 determines (e.g., via Poincare map analysis) that one or more of these sequences of ten non-macro instructions should be replaced by corresponding macro instructions, then hardware description library 110 can simply copy corresponding implementations to handle these macro instructions (already stored in hardware description library 110) to reconfigurable logic unit 106. In some embodiments, all permutations of sequences of non-macro instructions up to a specified sequence length are accounted for in hardware description library 110, and corresponding implementations to handle corresponding macro functions are ready to be transferred to reconfigurable logic unit 106. In a data center environment, it is particularly feasible to store/account for these permutations because the amount of memory used to store/account for the permutations would represent an insubstantial portion of overall available data center memory.

In the example illustrated in FIG. 1, portions of the communication path between the components are shown. Other communication paths may exist, and the example of FIG. 1 has been simplified to illustrate the example clearly. Although single instances of components have been shown to simplify the diagram, additional instances of any of the components shown in FIG. 1 may exist. The number of components and the connections shown in FIG. 1 are merely illustrative. For example, additional instances of central processing unit 102 may exist and may be connected to hardware description library 110. Central processing unit 102 and hardware description library 110 may be physically separate systems that are not necessarily located in the same geographic location. Components not shown in FIG. 1 may also exist.

Figure 2:
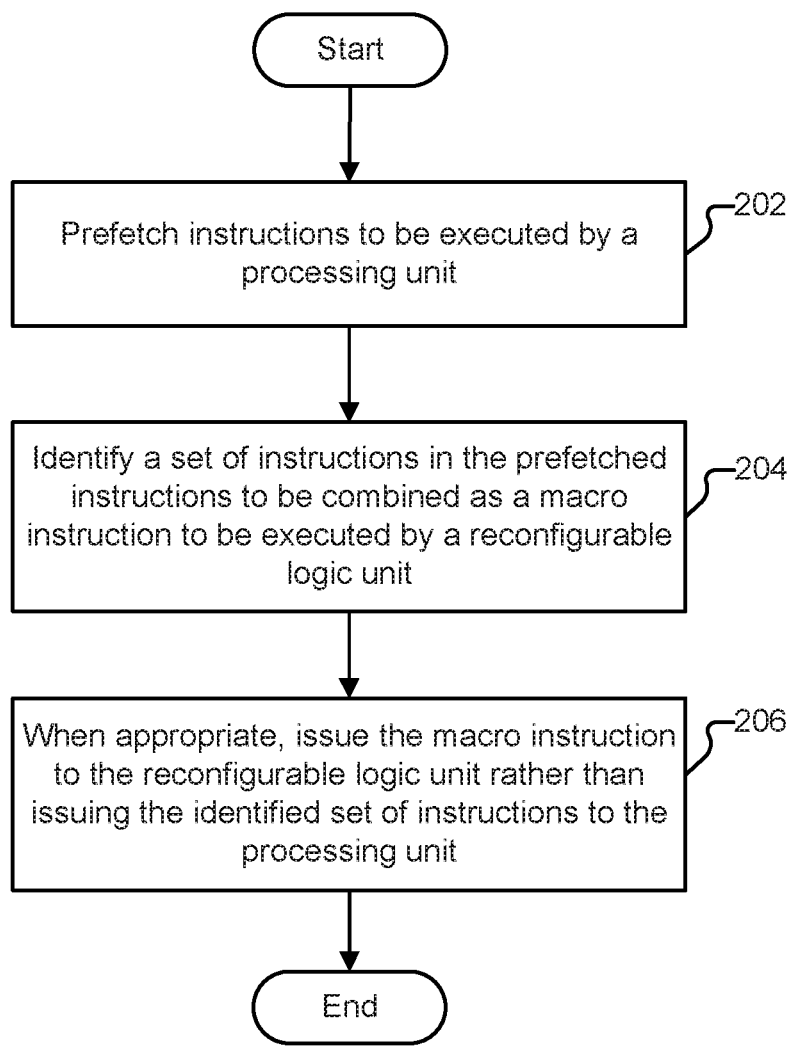
FIG. 2 is a flow chart illustrating an embodiment of a process for operating a reconfigurable processing unit.

FIG. 2 is a flow chart illustrating an embodiment of a process for operating a reconfigurable processing unit. In some embodiments, this process is performed by central processing unit 102 of FIG. 1.

At 202, instructions to be executed by a processing unit are prefetched. In some embodiments, the instructions that are prefetched are to be executed by processing unit 104 of FIG. 1. Prefetching of the instructions may be performed by control unit 108 of FIG. 1. The instructions that are prefetched are non-macro instructions belonging to a predefined instruction set that a processing unit (e.g., processing unit 104 of FIG. 1) is configured to handle (e.g., instructions associated with copying data from memory to a register and vice versa, performing an arithmetic operation with respect to values stored in two registers, comparing values stored in two registers, and controlling computer program flow). The number of instructions prefetched may vary. Prefetching more instructions allows for longer sequences of non-macro instructions to be replaced by macro instructions.

At 204, a set of instructions in the prefetched instructions to be combined as a macro instruction to be executed by a reconfigurable logic unit is identified. In various embodiments, the identification is performed by control unit 108 of FIG. 1. In some embodiments, the macro instruction is executed by reconfigurable logic unit 106 of FIG. 1. Replacing longer sequences of non-macro instructions typically results in greater performance gains. In the context of a data center environment, sequences of non-macro instructions that occur frequently (thus resulting in frequent replacement with macro instructions) can occur when data center networking components and/or computers are subjected to repetitive workloads (e.g., performing matrix operations on large data sets, such as machine learning training data sets).

At 206, when appropriate, the macro instruction (replacing non-macro instructions) is issued to the reconfigurable logic unit (e.g., reconfigurable logic unit 106 of FIG. 1) rather than issuing the identified set of (non-macro) instructions (corresponding to the macro instruction) to the processing unit (e.g., processing unit 104 of FIG. 1). In some embodiments, control unit 108 of FIG. 1 handles the coordination of issuance of macro instructions (e.g., to reconfigurable logic unit 106 of FIG. 1) and non-macro instructions (e.g., to processing unit 104 of FIG. 1). Issuance of macro instructions and non-macro instructions is coordinated such that no macro instruction overlaps with any non-macro instruction that is part of a set of non-macro instructions replaced by that macro instruction.

Figure 3:
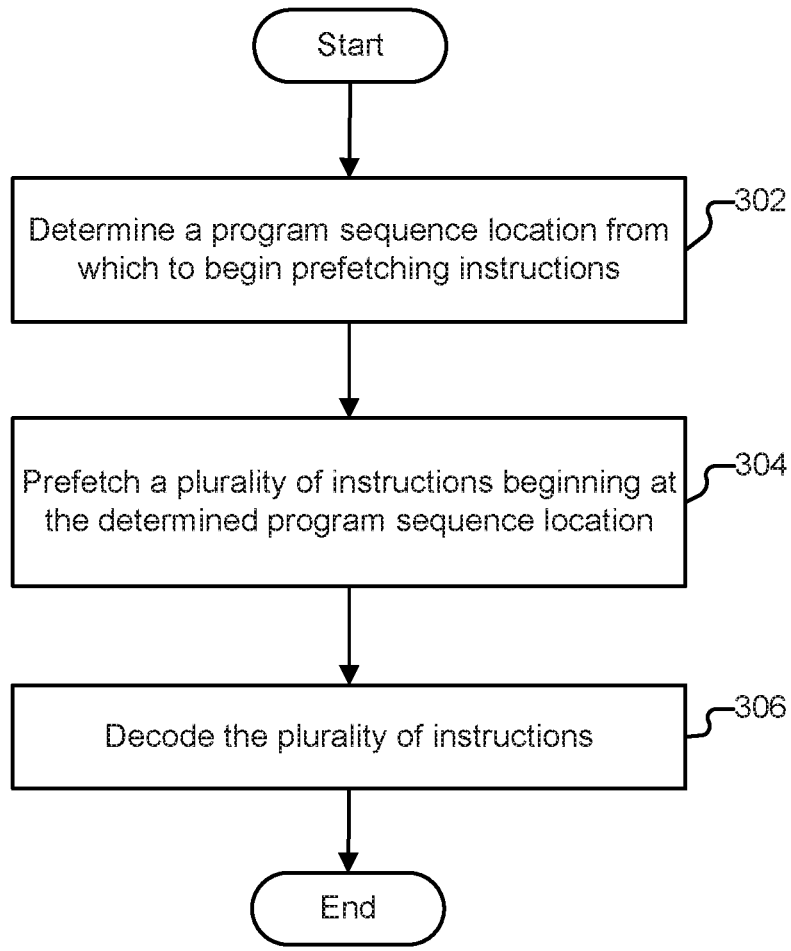
FIG. 3 is a flow chart illustrating an embodiment of a process for prefetching instructions to be executed by a processing unit.

FIG. 3 is a flow chart illustrating an embodiment of a process for prefetching instructions to be executed by a processing unit. FIG. 3 provides a more detailed illustration of step 202 of FIG. 2. In some embodiments, the process of FIG. 3 is performed by control unit 108 of FIG. 1.

At 302, a program sequence location from which to begin prefetching instructions is determined. The program sequence location from which to begin prefetching corresponds to a location in the program sequence for a non-macro instruction that has yet to be executed. In various embodiments, the program sequence location from which to begin prefetching is a sufficient number of instructions in the future such that analysis of prefetched instructions to be combined into macro instructions (e.g., as illustrated in FIG. 4) will have been completed by the time the program sequence reaches the first instruction in the prefetched instructions.

At 304, a plurality of instructions beginning at the determined program sequence location is prefetched. In various embodiments, instructions in the program sequence are stored in memory located within a CPU (e.g., central processing unit 102 of FIG. 1). In some embodiments, control unit 108 of FIG. 1 prefetches instructions from memory associated with processing unit 104 of FIG. 1. The number of instructions that are prefetched may be related to a maximum non-macro instruction sequence length of non-macro instructions to replace with macro instructions. For example, if the maximum length is 10, it might not be necessary to prefetch a number of instructions that is a very large multiple of 10 (e.g., 100). In some embodiments, prefetching is done cumulatively to allow analysis of non-macro instructions to replace with macro instructions to occur over moving windows of instructions. For example, 50 instructions can be prefetched, analysis of non-macro instructions to replace with macro instructions can begin (e.g., as illustrated in FIG. 4), 50 more instructions can be prefetched, and analysis of non-macro instructions to replace with macro instructions can continue into regions of overlap between the first 50 prefetched instructions and the subsequent 50 prefetched instructions.

At 306, the plurality of (prefetched) instructions is decoded. In some embodiments, control unit 108 of FIG. 1 performs the decoding. In various embodiments, decoding includes analyzing opcode portions of prefetched instructions. In various embodiments, determining opcodes allows for identification of non-macro instruction types and facilitates analysis of sequences of non-macro instructions to combine into macro instructions.

Figure 4:
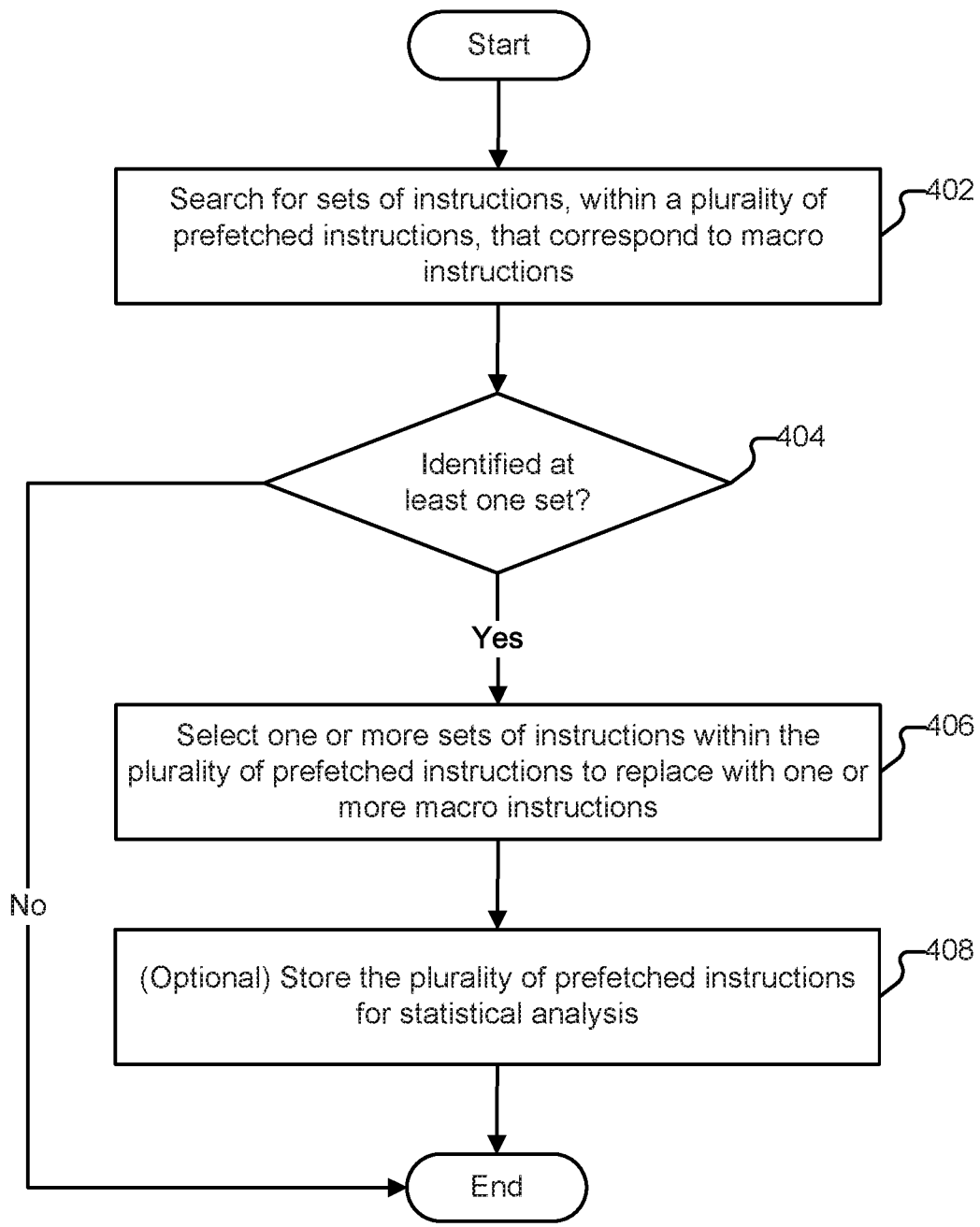
FIG. 4 is a flow chart illustrating an embodiment of a process for identifying sets of non-macro instructions to replace with macro instructions.

FIG. 4 is a flow chart illustrating an embodiment of a process for identifying sets of non-macro instructions to replace with macro instructions. FIG. 4 provides a more detailed illustration of step 204 of FIG. 2. In some embodiments, the process of FIG. 4 is performed by control unit 108 of FIG. 1. In some embodiments, the process of FIG. 4 is performed on instructions prefetched using the process illustrated in FIG. 3.

Figure 5:
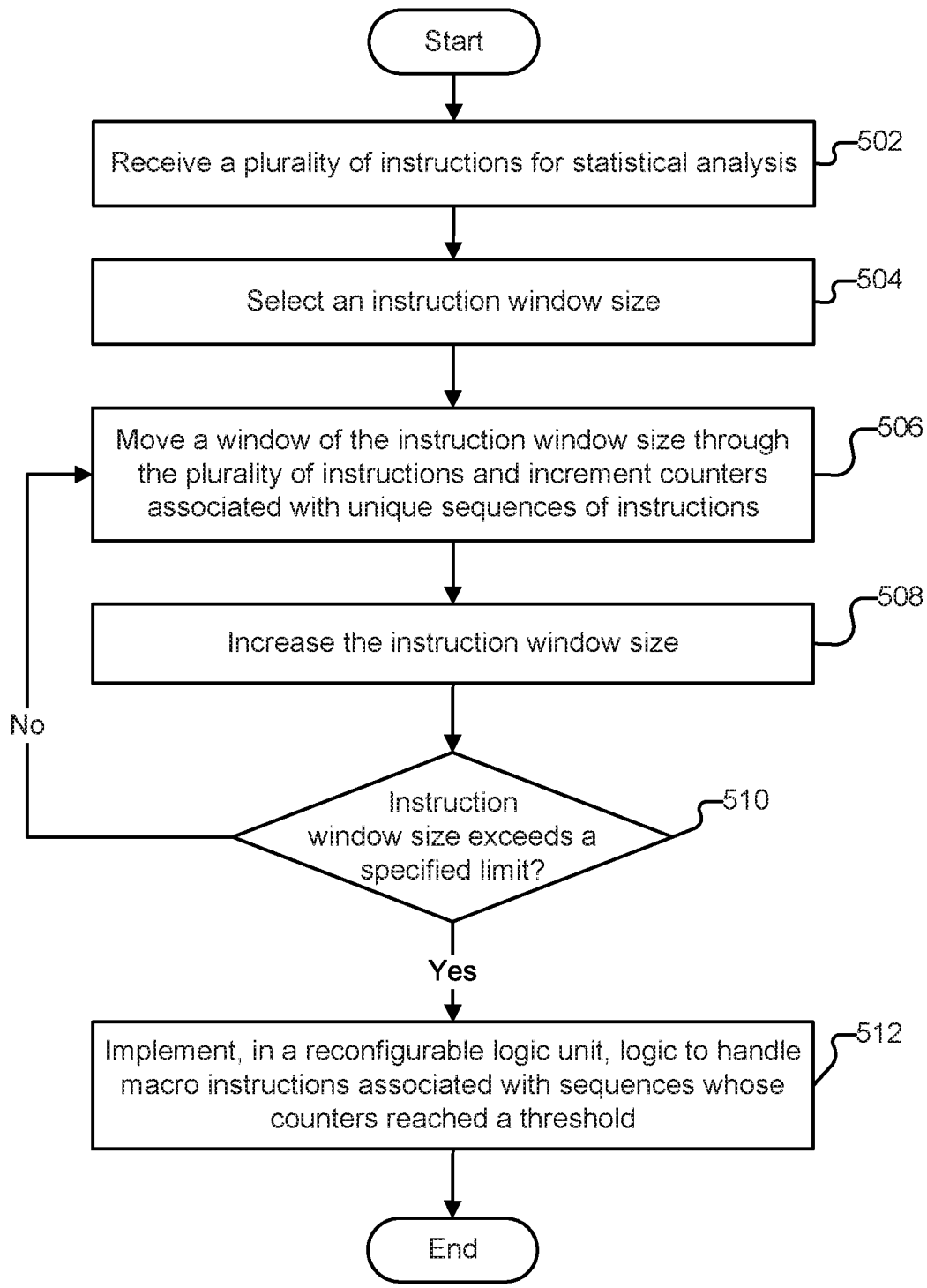
FIG. 5 is a flow chart illustrating an embodiment of a process for identifying sets of non-macro instructions that have not already been pre-synthesized and/or programmed as macro instructions to pre-synthesize and/or program as macro instructions.

At 402, sets of instructions, within a plurality of prefetched instructions, that correspond to macro instructions are searched for. In various embodiments, the sets of instructions that are searched for are sequences of instructions (that may vary in length) corresponding to macro instructions that a reconfigurable logic unit (e.g., reconfigurable logic unit 106 of FIG. 1) is configured to handle. A process for determining which macro instruction logic implementations to pre-synthesize and program into the reconfigurable logic unit is illustrated in FIG. 5. Higher performance gain (e.g., acceleration of computation) is achieved when longer sequences of non-macro instructions are replaced by macro instructions. For example, if a sequence of non-macro instructions that copies the value stored in a specified register into multiple other registers one after another is replaced by a macro instruction that copies the value stored in the specified register into the other registers all at once, then a performance gain could be achieved. In the context of a data center environment, copying the value stored in one register to multiple other registers (e.g., all registers that store computational data) might occur frequently, particularly when performing matrix computations related to machine learning applications. In some embodiments, compiler optimization can be performed on program code to remove jumps and conditional branches in the program code. Such an optimization might allow for more frequent identification of longer sequences of non-macro instructions to replace with macro instructions.

At 404, it is determined whether at least one set of non-macro instructions has been identified and can be replaced by a macro instruction. If it is determined that no set of non-macro instructions can be replaced by a macro instruction, then steps 406 and 408 are skipped and non-macro instructions will continue to be executed one after another (e.g., by processing unit 104 of FIG. 1).

If at 404, it is determined that at least one set of non-macro instructions has been identified and can be replaced by a macro instruction, at 406, one or more sets of instructions within the plurality of prefetched instructions are selected to replace with one or more macro instructions. In some embodiments, the first set of non-macro instructions to appear in the plurality of prefetched instructions that can be replaced with a macro instruction is selected to be replaced by a macro instruction, after which the next non-overlapping set of non-macro instructions that can be replaced with a macro instruction is then replaced with a next macro instruction, and so forth. A longest sequence of non-macro instructions within the plurality of prefetched instructions may also be selected to be replaced with a macro instruction (the longest sequence would not necessarily be the first sequence in the plurality of prefetched instructions that can be replaced with a macro instruction), after which other sequences of non-macro instructions (e.g., in order of next longest to shortest) can be identified to be replaced with macro instructions.

At 408, optionally, the plurality of prefetched instructions are stored for statistical analysis. In some embodiments, patterns of non-macro instructions within the prefetched instructions are analyzed (e.g., tracked and counted) to determine which sequences of non-macro instructions that have not already been pre-synthesized and/or programmed as macro instructions to be handled by a reconfigurable logic unit should be pre-synthesized and/or programmed as macro instructions to be handled by a reconfigurable logic unit (e.g., reconfigurable logic unit 106 of FIG. 1). In some embodiments, a software program is used to perform the analysis to determine which sequences of non-macro instructions should be pre-synthesized and/or programmed as macro instructions. In some embodiments, this analysis is performed using digital logic in control unit 108 of FIG. 1. This analysis is illustrated in further detail in FIG. 5-7. In situations in which no additional macro instructions need to be pre-synthesized and/or programmed (e.g., when reconfigurable logic unit 106 is an ASIC and/or when enough analysis has already been performed to determine that the macro instructions already handled by reconfigurable logic unit 106 are sufficient), step 408 can be skipped.

FIG. 5 is a flow chart illustrating an embodiment of a process for identifying sets of non-macro instructions that have not already been pre-synthesized and/or programmed as macro instructions to pre-synthesize and/or program as macro instructions. In some embodiments, the process of FIG. 5 is performed by control unit 108 of FIG. 1. In some embodiments, control unit 108 of FIG. 1 directs a software program to perform the process of FIG. 5.

At 502, a plurality of instructions is received for statistical analysis (e.g., analysis to determine frequencies of patterns of non-macro instructions). In some embodiments, the instructions are received as a result of step 408 in FIG. 4.

Figure 6:
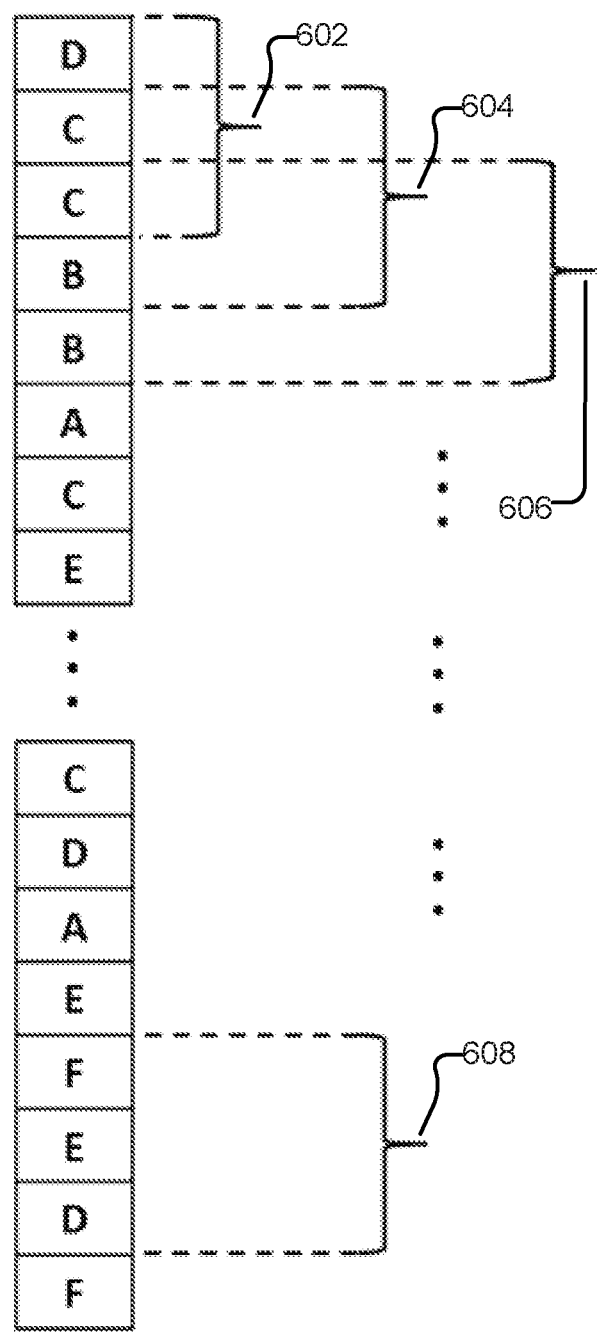
FIG. 6 is a diagram illustrating an example of how sequences of non-macro instructions are tracked and counted.

At 504, an instruction window size is selected. The instruction window size corresponds to a sequence length for sequences of non-macro instructions to track and count. FIG. 6 illustrates an example in which the instruction window size is three instructions. In the example shown in FIG. 6, non-macro instruction sequences that are three instructions in length are tracked and counted.

At 506, a window of the instruction window size is moved through the plurality of instructions, and counters associated with unique sequences of instructions are incremented. In the example of FIG. 6 (in which the instruction window size is three instructions), a window that is three instructions in length is moved through the plurality of instructions (where each instruction type is represented as a capital letter in FIG. 6). For example, the first sequence of three instructions in FIG. 6 is DCC (grouping 602), the second sequence is CCB (grouping 604), the third sequence is CBB (grouping 606), and the next to last sequence is FED (grouping 608). In various embodiments, each unique sequence has a counter associated with it, and when an instance of that unique sequence is encountered, the counter is incremented. In some embodiments, the counters are implemented as shift registers. The counters may also be implemented in software.

At 508, the instruction window size is increased. For example, the instruction window size of three illustrated in FIG. 6 might be increased to four.

At 510, it is determined whether the instruction window size has exceeded a specified limit. For example, if it is specified that non-macro instruction sequences of length twenty or fewer are to be tracked and counted, the specified instruction window size limit will be exceeded when the instruction window size reaches twenty-one instructions. If at 510 it is determined that the specified limit has not been exceeded, then steps beginning at step 506 are repeated. For example, in the example of FIG. 6 (in which the instruction window size is three instructions), the window size can be increased to four instructions, and sequences of instructions of length four can be tracked and counted in the plurality of instructions shown in FIG. 6. If at 510 it is determined that the specified limit has been exceeded, then step 512 is performed.

At 512, logic to handle macro instructions associated with sequences whose counters reached a threshold is implemented in a reconfigurable logic unit (e.g., reconfigurable logic unit 106 of FIG. 1). In some embodiments (e.g., when shift registers are used as counters), thresholds are reached when shift registers overflow. When a shift register overflows, a signal may be triggered to indicate that logic for a macro instruction associated with the shift register should be implemented in the reconfigurable logic unit. As described in detail below with respect to FIG. 7, in various embodiments, Poincare maps are used to visualize and analyze frequencies of non-macro instruction patterns. Poincare maps may be used to determine which sequences of non-macro instructions should be implemented as macro instructions. In various embodiments, logic implementations for macro instructions to be implemented in the reconfigurable logic unit are stored in a hardware description library (e.g., hardware description library 110 of FIG. 1) and noted as such. Macro instruction logic implementations may be transferred from the hardware description library to a plurality of reconfigurable logic units (e.g., reconfigurable logic units in various central processing units in a data center environment).

FIG. 6 is a diagram illustrating an example of how sequences of non-macro instructions are tracked and counted. See above for a detailed description.

Figure 7:
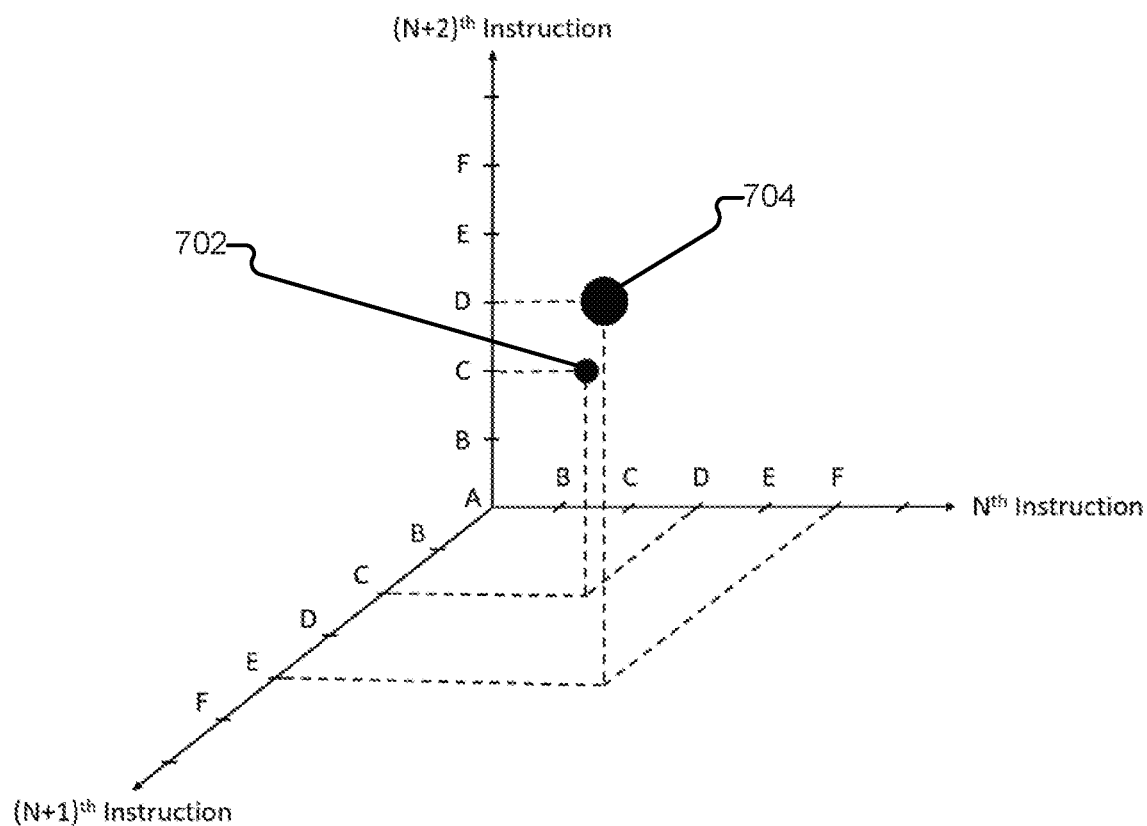
FIG. 7 is a diagram illustrating the use of a Poincaré map to visualize and analyze frequencies of non-macro instruction patterns.

FIG. 7 is a diagram illustrating the use of a Poincare map to visualize and analyze frequencies of non-macro instruction patterns. Poincare maps may be used to plot recurrences of patterns. In the example shown in FIG. 7, recurrences of sequences of non-macro instructions that are three instruction in length (as illustrated in FIG. 6) are plotted. Each axis represents the position of an instruction in a sequence of instructions. In the example shown in FIG. 7, the x-axis represents an $N^{th}$ instruction, the y-axis represents an $(N+1)^{th}$ instruction, and the z-axis represents an $(N+2)^{th}$ instruction. For example, in the case of sequences of instructions that are three instructions in length, the axes represent the $1^{st}$, $2^{nd}$ and $3^{rd}$ instructions in any three-instruction sequence. The example shown in FIG. 7 corresponds to the example shown in FIG. 6. Point 702 of FIG. 7 indicates the specific instruction sequence of DCC (D on the x-axis, C on the y-axis, and C on the z-axis). Point 702 of FIG. 7 corresponds to grouping 602 of FIG. 6. Point 704 of FIG. 7 indicates the specific instruction sequence of FED (F on the x-axis, E on the y-axis, and D on the z-axis). Point 704 of FIG. 7 corresponds to grouping 608 of FIG. 6. Only two points are shown in the example of FIG. 7 for clarity of illustration. In some embodiments, the frequency of any particular sequence of instructions (e.g., indicating how common that sequence of instructions is) is represented in the Poincare map as the size of the point associated with that sequence. For example, as illustrated in FIG. 7, point 704 is larger than point 702, indicating that the sequence associated with point 704 (FED) has occurred more frequently than the sequence associated with point 702 (DCC). Clusters and patterns of frequent instruction sequences (e.g., those associated with large points) may be visualized. Frequent instruction sequences that are visualized and/or analyzed via Poincare maps may be marked as non-macro instruction sequences for which macro instruction logic implementations should be stored in a hardware description library and/or transferred to a reconfigurable logic unit. Higher dimensional Poincare maps can also be constructed (e.g., a four-dimensional map to represent sequences of non-macro instructions that are four instructions in length).

Figure 8:
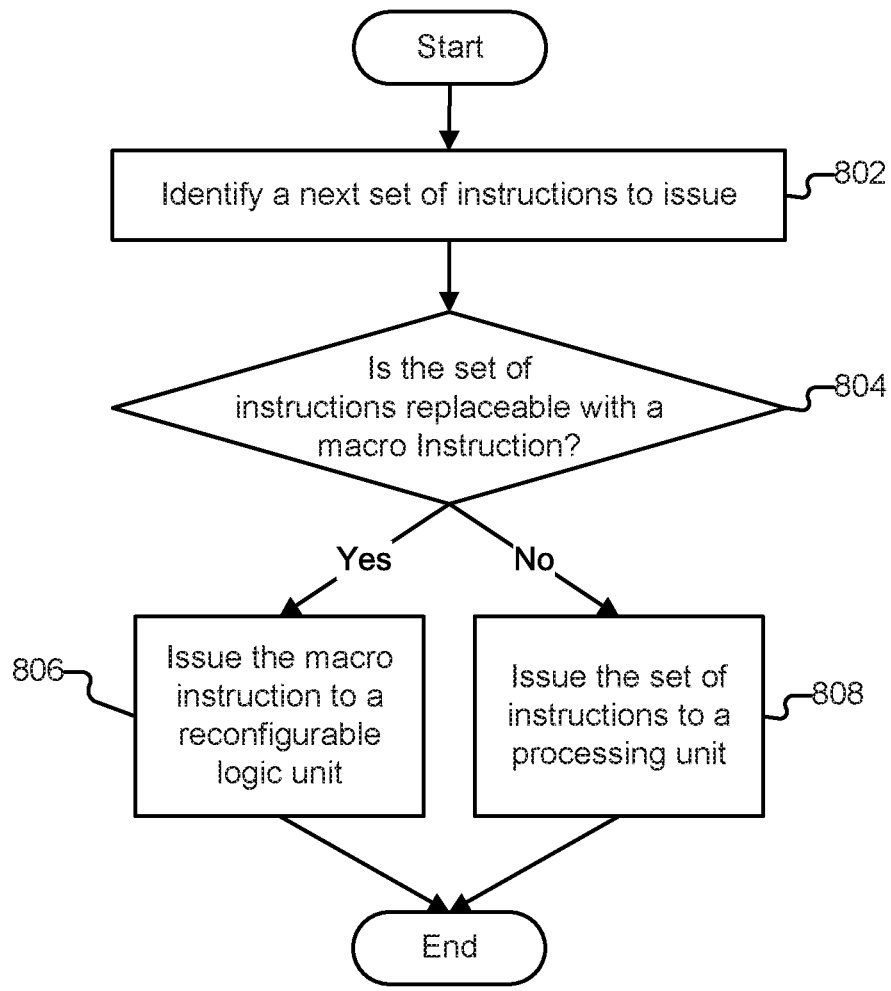
FIG. 8 is a flow chart illustrating an embodiment of a process for coordinating the issuance of non-macro instructions and macro instructions.

FIG. 8 is a flow chart illustrating an embodiment of a process for coordinating the issuance of non-macro instructions and macro instructions. FIG. 8 provides a more detailed illustration of step 206 of FIG. 2. In some embodiments, the process of FIG. 8 is performed by control unit 108 of FIG. 1.

At 802, a next set of (non-macro) instructions to issue is identified. In various embodiments, the next set of instructions to issue are instructions following a current instruction whose location is stored in a program counter.

At 804, it is determined whether the set of instructions is replaceable with a macro instruction. In some embodiments, the process illustrated in FIG. 4 is performed to determine if there are any sets of non-macro instructions in the instruction pipeline that can be replaced with macro instructions. In various embodiments, the locations in the program sequence where macro instructions begin and end are determined by control unit 108 of FIG. 1. If it is determined at 804 that the set of instructions is replaceable with a macro instruction, then step 806 is performed. Stated alternatively, if it is determined that the instruction following the current instruction in the program sequence is the beginning of a macro instruction, then step 806 is performed. Otherwise, step 808 is performed.

At 806, the macro instruction is issued to a reconfigurable logic unit (e.g., reconfigurable logic unit 106 of FIG. 1). The (non-macro) instructions corresponding to (i.e., being replaced by) the macro instruction are not issued. The macro instruction is executed by the reconfigurable logic unit in lieu of the non-macro instructions being executed by a processing unit (e.g., processing unit 104 of FIG. 1).

At 808, the set of (non-macro) instructions is issued to a processing unit (e.g., processing unit 104 of FIG. 1). Step 808 is performed when it is determined that none of the instructions in a set of instructions belong to and/or are replaceable with a macro instruction. In this situation, all of the instructions in the set are issued to the processing unit. This scenario represents normal operation of a central processing unit in the sense that it is how the central processing unit would operate without the presence of a reconfigurable logic unit.

A reconfigurable processing unit has been disclosed. A reconfigurable processing unit possesses several benefits. It allows CPUs to obtain flexibility with respect to instructions that CPUs are able to handle. For example, specialized instructions belonging to a specialized instruction set can be added to RISC or other predefined instruction sets as needed and tailored to specific applications. This results in expending fewer resources (e.g., in terms of power consumption and integrated circuit space) than an alternative strategy of implementing a comprehensive instruction set that supports a heterogenous mix of applications. Stated alternatively, implementing a comprehensive instruction set leads to many types of instructions not being used most of the time (because any one specific application would not need all of the instructions in the comprehensive instruction set), resulting in wasted resources (e.g., in terms of power consumption and integrated circuit space). Using a reconfigurable processing unit results in performance enhancement (e.g., faster processing) when macro instructions can be used frequently, which is particularly the case when computing tasks present repetitive workloads (as the case might be with certain data center computing tasks).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A central processing unit, comprising:
a processing unit configured to handle a predefined instruction set;
a reconfigurable logic unit configured to handle a specialized instruction set including a first macro instruction, wherein the first macro instruction has been identified for inclusion in the specialized instruction set based on a determination of frequencies of occurrence of patterns of instructions belonging to the predefined instruction set based on use of a Poincaré map that plots sequences of instructions using a first axis representing a first order instruction in a specific sequence, a second axis representing a second order instruction in the specific sequence, and third axis representing a third order instruction in the specific sequence; and
a control unit configured to:
prefetch instructions to be executed;
identify sets of instructions included in the prefetched instructions, wherein each set included in the identified sets is able to be replaced with a corresponding macro instruction for potential execution by the reconfigurable logic unit;
identify a sequence length of each of the identified sets of instructions and select a set of instructions in the identified sets determined to have a longest sequence length for replacement with the first macro instruction to be executed by the reconfigurable logic unit;
after selecting the set of instructions determined to have the longest sequence length, identify a next longest set of instructions in the sets of instructions for replacement with a second macro instruction to be executed by the reconfigurable logic unit; and
issue the first macro instruction and the second macro instruction to the reconfigurable logic unit rather than issuing the corresponding replaced instructions to the processing unit.

2. The central processing unit of claim 1, wherein the predefined instruction set is a RISC instruction set.

3. The central processing unit of claim 1, wherein the reconfigurable logic unit is an FPGA.

4. The central processing unit of claim 1, wherein the reconfigurable logic unit is configured to handle a specialized instruction set including the first macro instruction.

5. The central processing unit of claim 1, further comprising a hardware description library.

6. The central processing unit of claim 5, wherein the hardware description library stores logic implementations for handling macro instructions that are transferred to the reconfigurable logic unit.

7. The central processing unit of claim 5, wherein the hardware description library is configured to transfer logic implementations for handling macro instructions to more than one reconfigurable logic unit.

8. The central processing unit of claim 1, wherein the central processing unit is included in a data center networking component.

9. The central processing unit of claim 1, wherein the first macro instruction is optimized for a machine learning computation.

10. The central processing unit of claim 1, wherein the set of instructions determined to have the longest sequence length occurs later in the prefetched instructions than the next longest set of instructions despite the set of instructions determined to have the longest sequence length being replaced prior to the next longest set of instructions.

11. The central processing unit of claim 1, wherein the control unit is configured to replace a shortest set of instructions in the sets of instructions last among the sets of instructions.

12. The central processing unit of claim 1, wherein the control unit is further configured to determine frequencies of occurrence of patterns of instructions belonging to the predefined instruction set.

13. The central processing unit of claim 12, wherein occurrences of patterns of instructions belonging to the predefined instruction set are counted with shift register counters.

14. The central processing unit of claim 12, wherein the control unit is further configured to store the prefetched instructions, and stored prefetched instructions are used to determine the frequencies of occurrence of the patterns of instructions belonging to the predefined instruction set.

15. The central processing unit of claim 1, wherein the Poincaré map is of a dimensionality higher than three.

16. The central processing unit of claim 1, wherein the control unit is further configured to identify a second set of instructions in the prefetched instructions to be combined as a second macro instruction to be executed by the reconfigurable logic unit.

17. A method, comprising:
- prefetching instructions to be executed by a processing unit that is configured to handle a predefined instruction set;
- identifying sets of instructions included in the prefetched instructions, wherein each set included in the identified sets is able to be replaced with a corresponding macro instruction for potential execution by a reconfigurable logic unit;
- identifying a sequence length of each of the identified sets of instructions and selecting a set of instructions in the identified sets determined to have a longest sequence length for replacement with a first macro instruction to be executed by the reconfigurable logic unit;
- after selecting the set of instructions determined to have the longest sequence length, identifying a next longest set of instructions in the sets of instructions for replacement with a second macro instruction to be executed by the reconfigurable logic unit; and
- issuing the first macro instruction and the second macro instruction to the reconfigurable logic unit rather than issuing the corresponding replaced instructions to the processing unit wherein the reconfigurable logic unit is configured to handle a specialized instruction set including the first macro instruction, and the first macro instruction has been identified for inclusion in the specialized instruction set based on a determination of frequencies of occurrence of patterns of instructions belonging to the predefined instruction set based on use of a Poincare map that plots sequences of instructions using a first axis representing a first order instruction in a specific sequence, a second axis representing a second order instruction in the specific sequence, and third axis representing a third order instruction in the specific sequence.

18. The method of claim 17, wherein the predefined instruction set is a RISC instruction set.

19. The method of claim 17, wherein the reconfigurable logic unit is an FPGA.

20. A computer program product, the computer program product being embodied in a non-transitory computer readable storage medium and comprising computer instructions for:
- prefetching instructions to be executed by a processing unit that is configured to handle a predefined instruction set;
- identifying sets of instructions included in the prefetched instructions, wherein each set included in the identified sets is able to be replaced with a corresponding macro instruction for potential execution by a reconfigurable logic unit;
- identifying a sequence length of each of the identified sets of instructions and selecting a set of instructions in the identified sets determined to have a longest sequence length for replacement with a first macro instruction to be executed by the reconfigurable logic unit;
- after selecting the set of instructions determined to have the longest sequence length, identifying a next longest set of instructions in the sets of instructions for replacement with a second macro instruction to be executed by the reconfigurable logic unit; and
- issuing the first macro instruction and the second macro instruction to the reconfigurable logic unit rather than issuing the corresponding replaced instructions to the processing unit;
- wherein the reconfigurable logic unit is configured to handle a specialized instruction set including the first macro instruction, and the first macro instruction has been identified for inclusion in the specialized instruction set based on a determination of frequencies of occurrence of patterns of instructions belonging to the predefined instruction set based on use of a Poincaré map that plots sequences of instructions using a first axis representing a first order instruction in a specific sequence, a second axis representing a second order instruction in the specific sequence, and third axis representing a third order instruction in the specific sequence.

* * * * *